United States Patent [19]

Tandrup

[11] 4,066,102

[45] Jan. 3, 1978

[54] HYDRAULIC REGULATOR

[75] Inventor: Niels Tandrup, Nordborg, Denmark

[73] Assignee: Danfoss A/S, Nordborg, Denmark

[21] Appl. No.: 676,736

[22] Filed: Apr. 14, 1976

[30] Foreign Application Priority Data

Apr. 18, 1975 Germany ............................ 2517205

[51] Int. Cl.[2] ..................... F16K 31/363; F16K 31/40

[52] U.S. Cl. .................................. 137/625.64; 91/464

[58] Field of Search ..................... 91/51, 52, 166, 464; 137/625.6, 625.64, 625.63

[56] References Cited

U.S. PATENT DOCUMENTS

| | | | |
|---|---|---|---|
| 2,591,800 | 4/1952 | Gardiner | 137/625.63 |
| 2,605,079 | 7/1952 | Miller | 137/625.64 |
| 2,655,940 | 10/1953 | Jackson | 137/625.63 |
| 2,800,143 | 7/1957 | Keller | 137/625.63 |
| 2,981,287 | 4/1961 | Caslow | 137/625.63 |
| 3,556,154 | 1/1971 | Kramer | 137/625.64 |
| 3,799,202 | 3/1974 | McAvoy | 91/51 X |

*Primary Examiner*—Robert G. Nilson

[57] ABSTRACT

The invention relates to a hydraulic regulator of a type which may be operated by electromagnetic switching valves. The assembly includes a piston and cylinder arrangement with position setting chambers at opposite ends thereof of larger diameter than the servo piston. Movable abutment elements in the chambers of larger diameter than the servo piston are biased by centering springs. There are parallel circuit branches in which the end chambers are disposed and switching valves are in these branches. The actuating of one of the valves to block its branch raises the pressure in the end chamber in that branch causing the piston to move in the other direction so as to move away from the biasing force of one spring biased element and engage the biasing force of the other spring biased element. When the other switching valve is actuated to block its branch to stop the piston in a desired position, the fluid pressure in the end chambers is equal. The spring bias acting through one of the abutment elements creates unequal biasing forces on the servo piston in the direction from which it started.

1 Claim, 2 Drawing Figures

HYDRAULIC REGULATOR

The invention relates to an improvement of a hydraulic regulator of the type comprising a piston which separates two pressure chambers of which the pressure condition can be influenced by preferably electromagnetic switching valves, which is loaded by neutral position springs and which is preferably coupled to an instant value transmitter acting together with a desired value transmitter on a control device for actuating the switching valves, particularly for adjusting a hydraulic control slide. The pressure chambers are each connected to a tank by way of a first passage containing a switching valve and to a source of pressure medium by way of a second passage containing a throttle-blocking combination which throttles when the switching valve in the associated passage is open and of which at least one effects blocking when the switching valves are closed.

This provides a regulator which can be made cheaply by using simple components and/or a small number of components. More particularly, two switching valves are adequate, the pressure faces of the piston can be of equal size and the piston can even be formed by a hydraulic control slide that is to be actuated and the end faces of which partially bound the pressure chambers.

It has now been found that to solve this same problem a basic principle can be derived from the regulator of the type referred to above to permit the development of further switching variations.

The present invention is based on a hydraulic regulator comprising a piston which separates two pressure chambers of which the pressure condition can be influenced by preferably electromagnetic switching valves, which is loaded by neutral position springs and which is preferably coupled to an instant value transmitter acting together with a desired value transmitter on a control device for actuating the switching valves, particularly for adjusting a hydraulic control slide, wherein the pressure chambers are each connected to a tank by way of a first passage and to a source of pressure medium by way of a second passage, the passages containing either a switching valve or a throttle. The characteristic resides in the fact that the switching valves are disposed in any desired adjacent passages and the throttles in the other two adjacent passages, wherein each passage lying in series with a passage containing a switching valve comprises a closure element which blocks at least when both switching valves are actuated in the blocking direction.

By actuating merely one switching valve, the piston is displaced in the one or other direction. By actuating the second switching valve as well, the piston is fixed in the position so reached.

A particularly simple circuit is obtained if a switching valve is disposed in each of a first passage and a second passage in series therewith, and the throttles, which are preferably adjustable, are disposed one in each of the other first and second passages lying in series. Since each switching valve at the same time constitutes the closure element lying in series with the other switching valve, no closure elements are required in addition to the two switching valves.

In another variation, provision is made that a switching valve is disposed in each of the second passages and a throttle-blocking combination in each of the first passages, which combination effects throttling in the associated passage when the switching valve is open and of which at least one effects blocking when the switching valves are closed.

In a throttle-blocking combination consisting of a series circuit of a main throttle and a blocking check valve, it is advisable for the blocking check valve to be spring-loaded and/or for the tank pressure to be held at a value above atmospheric pressure. In this way the pressure arising from the neutral position springs of the piston can be so compensated that the check valve remains closed during blocking of both switching valves.

The construction becomes very simple if the throttle-blocking combination comprises a blocking check valve having such a limited stroke that a throttle is formed in the open position.

The invention will now be described in more detail in connection with two examples:

Figure 1:
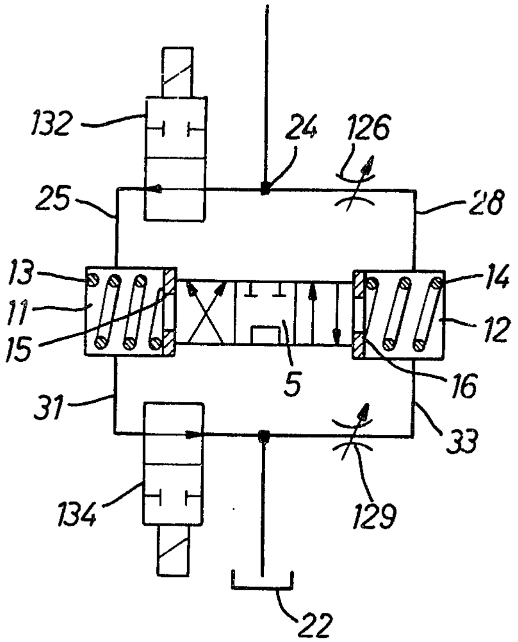
FIG. 1 shows a first embodiment of the invention.

At the point 24 there is a constant pressure of for example 10 bar which can be created by means of a pump (not shown) and a downstream constant pressure regulator (not shown) or in some other manner. A control slide 1 is to be controlled, of which the piston 5 simultaneously serves as the piston of the regulator in so far that its end faces of equal size partially bound the two pressure chambers 11 and 12. The piston 5 is additionally loadable by way of abutment rings 15 or 16 by neutral position springs 13 and 14 which, on maximum deviation, for example exert a force that gives rise to a pressure of 3 bar in the opposite pressure chamber. The pressure chambers 11 and 12 are each connected to a tank 22 by way of a first passage 31 or 33 and to the point 24 of constant pressure by way of a second passage 25 or 28. The passages 25 and 31 form a first series circuit and the passages 28 and 33 a second series circuit between the point 24 and the tank 22.

In the embodiment according to FIG. 1, one of the two switching valves 132 and 134 is disposed in each of the two passages 25 and 31 lying in series. These switching valves can be actuated by a control device which, in turn, can be influenced by a desired value transmitter and by an instantaneous value transmitter that is coupled to the piston 5. An adjustable throttle 126 and 129 is located in each of the passages 28 and 33 of the second series circuit. The two throttle resistances are so set that, in the illustrated rest position of both switching valves 132 and 134, the same pressure obtains in both pressure chambers 11 and 12, i.e. the piston 5 retains its illustrated neutral position. The intermediate pressure that is in this way prescribed in the pressure chamber 12 is maintained during the entire operation. It is higher than the pressure that would be exerted by the neutral position spring 13 if the latter is completely compressed. If, now, the switching valve 132 is closed, the pressure in the pressure chamber 11 drops. Consequently, the piston 5 moves to the left. If the switching valve 134 is subsequently also closed, the piston 5 remains in the displaced position because the pressure medium is enclosed in the pressure chamber 11. If, conversely, the switching valve 132 is open and the switching valve 134 is closed, a higher pressure obtains in the pressure chamber 11 than in the pressure chamber 12 and the piston moves to the right. If, now, the switching valve 132 is closed, the piston again remains in its new position because the pressure medium is enclosed in the pressure chamber 11.

Figure 2:
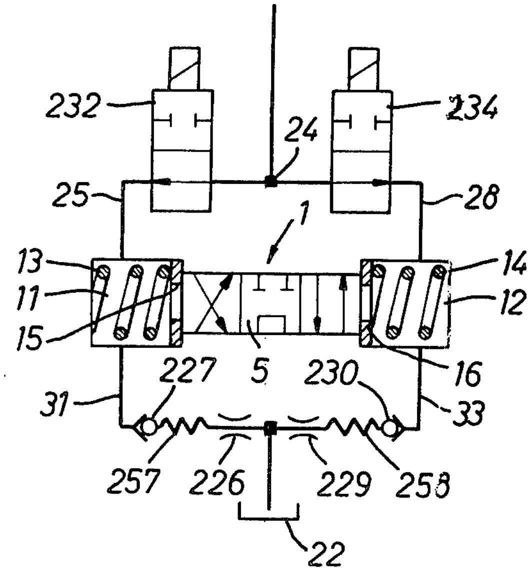
FIG. 2 shows a second embodiment of the invention.

Whereas in FIG. 1 the switching valves 132 and 134 are disposed in the adjacent passages 25 and 31, the switching valves 232 and 234 of the FIG. 2 embodiment are disposed in the adjacent second passages 25 and 28. The adjacent first passages 31 and 33 each contain a throttle-blocking combination comprising the series circuit of a main throttle 226 and a blocking check valve 227 loaded by a weak spring 257 or the series circuit of a main throttle 229 and a blocking check valve 230 loaded by a weak spring 258. In particular, the throttle may be formed in that the blocking check valve has only a limited stroke. The springs 257 and 258 may also be dispensed with. A pressure obtains in the tank 22 which is higher than atmospheric pressure, preferably at least 3 bar.

When both switching valves 232 and 234 are disposed in the illustrated rest position, the same pressure obtains in the pressure chambers 11 and 12, which pressure is slightly less than the pressure of the point 24. Consequently, the piston 5 assumes the illustrated neutral position. If, now, the switching valve 232 is closed, the pressure in the pressure chamber 11 drops and the piston 5 moves to the left. If, now, the switching valve 234 is closed, the pressure in the pressure chamber 12 also drops to about the tank pressure and the slide 5 interrupts its movement toward the left. By reason of the compressed spring 13, a pressure obtains in the pressure chamber 11 is less than the tank pressure to the extent of the spring effect. Consequently, the blocking check valve 227 closes. The slide 5 remains in its position because the switching valve 232 as well as the blocking check valve 227 are closed.

I claim:

1. A hydraulic regulator system comprising a slide valve member having end faces, first and second pressure chambers at opposite ends of said valve member bounded in part by said end faces, centering springs in said chambers biasing said valve member towards a neutral position, supply and exhaust lines, first and second parallel lines between said supply and exhaust lines in which said first and second chambers are respectively disposed, a pair of switching valves in said parallel lines for selectively moving said slide valve member in either desired direction, a pair of throttle means in said parallel lines, said switching valves being upstream and downstream from the said chamber in said first parallel line, and said throttle means being in said second parallel line upstream and downstream from the said chamber in said second parallel line.

* * * * *